(12) United States Patent
Campbell

(10) Patent No.: US 11,887,119 B1
(45) Date of Patent: Jan. 30, 2024

(54) SYSTEM AND METHOD FOR MANAGING USER DIGITAL ASSETS WHILE MAINTAINING SECURITY AND PRIVACY

(71) Applicant: Orrin Vincent Campbell, Wappingers Falls, NY (US)

(72) Inventor: Orrin Vincent Campbell, Wappingers Falls, NY (US)

(73) Assignee: Orrin Vincent Campbell, Wappingers Falls, NY (US)

( * ) Notice: Subject to any disclaimer, the term of this patent is extended or adjusted under 35 U.S.C. 154(b) by 0 days.

(21) Appl. No.: 18/211,378

(22) Filed: Jun. 19, 2023

(51) Int. Cl.
*G06Q 20/40* (2012.01)
*G06Q 20/38* (2012.01)
*G06Q 20/36* (2012.01)

(52) U.S. Cl.
CPC .......... *G06Q 20/401* (2013.01); *G06Q 20/36* (2013.01); *G06Q 20/389* (2013.01)

(58) Field of Classification Search
CPC ..... G06Q 20/401; G06Q 20/36; G06Q 20/389
See application file for complete search history.

(56) References Cited

U.S. PATENT DOCUMENTS

| | | | | |
|---|---|---|---|---|
| 2019/0228409 A1* | 7/2019 | Madisetti | ............... | G06Q 40/03 |
| 2020/0311790 A1* | 10/2020 | Keren | ................ | G06Q 20/4016 |
| 2022/0138640 A1* | 5/2022 | Augustine | ............... | G06F 21/16 |
| | | | | 705/5 |
| 2022/0374902 A1* | 11/2022 | Sabintsev | .......... | G06Q 20/3676 |
| 2023/0043702 A1* | 2/2023 | Sells | ....................... | G06Q 40/03 |
| 2023/0055064 A1* | 2/2023 | Dalmia | .................. | G06Q 50/01 |
| 2023/0118213 A1* | 4/2023 | Quigley | ................. | G06Q 20/40 |
| | | | | 705/65 |
| 2023/0123865 A1* | 4/2023 | Quigley | ............... | G06Q 20/389 |
| | | | | 705/65 |
| 2023/0124806 A1* | 4/2023 | Quigley | ............... | G06Q 20/367 |
| | | | | 705/65 |
| 2023/0196397 A1* | 6/2023 | Besecker | ........... | G06Q 30/0209 |
| | | | | 705/14.12 |
| 2023/0237471 A1* | 7/2023 | Siedleczka | ........... | G06Q 20/387 |
| | | | | 705/75 |

* cited by examiner

*Primary Examiner* — Patrick McAtee
*Assistant Examiner* — Nakia Leffall-Allen

(57) ABSTRACT

The present invention is provides a system or a computer implemented user digital assets management method for managing digital assets of a user while maintaining privacy and security. The digital assets are converted into anonymous data having a verifiable portion and an encrypted portion. The verifiable portion contains non identifiable information of the user and the encrypted portion contains identifiable information of the user. The identifiable information includes user personal data. The user has control on the anonymous data and grants access to the service provider accordingly.

20 Claims, 4 Drawing Sheets

SYSTEM AND METHOD FOR MANAGING USER DIGITAL ASSETS WHILE MAINTAINING SECURITY AND PRIVACY

FIELD OF THE INVENTION

The present invention generally relates to systems and methods for managing user digital assets while maintaining security of the digital assets and privacy of user data.

BACKGROUND OF THE INVENTION

The management of digital assets, including user personal data, has become increasingly complex as more individuals and businesses store and transact digital assets across multiple blockchain networks and web 2.0 platforms. This has led to the need for a secure and efficient way to manage and transact digital assets across various networks. Traditional digital asset management systems are often fragmented and do not provide a comprehensive solution for users to manage and transact their digital assets across multiple platforms. Furthermore, traditional digital asset management systems often lack robust security features, which can result in the loss or theft of digital assets.

Virtual markets are developing rapidly in line with the Internet growth, many different blockchains with a decentralized ledger have been developed. These ledgers are termed as cryptocurrencies and there are tremendous security issues with the cryptocurrencies. As these currencies gain market volume and value against physical currency, an increased opportunities exists for hackers and thieves to capture and steal virtual currencies/cryptocurrencies.

To address these issues, there is a need for a multichain blockchain-based digital asset management system with integrated payment gateway and social media integration. The system needs to be designed to provide a comprehensive solution for users to securely store, manage, and transact their digital assets, including data, across multiple blockchain and web 2.0 platforms. The systems or methods needs to be efficient to provide users security and privacy for their digital assets and solutions for controlling their data while monetizing.

SUMMARY OF THE INVENTION

The present invention is related to system or a computer implemented user digital assets management method configured to be implemented using a digital wallet service that operatively communicates with at least one service provider and at least one user device via at least one network, the method comprising: receiving at the digital wallet service, digital assets associated with a user from the at least one network, wherein the digital assets includes cryptocurrencies data and social media data, the cryptocurrencies data is received from at least one user cryptocurrency account and the social media data is received from at least one user social media account; processing at the digital wallet service the received social media data into specialized data, the specialized data including a verifiable portion of the social media data used for user verification and an encrypted portion of the social media data used for user identification, wherein the encrypted portion is decrypted using a user only private key and the verifiable portion includes ownership data associated with the user only private key; converting by the digital wallet service the specialized data into a machine readable format before storing in a local storage; storing the digital assets in the local storage; receiving a request from at least one service provider to access the specialized data of the user; verifying the user using the verifiable portion of the specialized data; decrypting by the user the encrypted portion of the specialized data using the user only private key; granting access of the decrypted specialized data to the at least one service provider by the user; creating a digital signature of the granted access to the decrypted specialized data, wherein the digital signature is stored on a block-chain network; receiving a reward from the at least one service provider to the user, for granting access to the specialized data; and storing the received reward in the at least one user account associated with the digital wallet service.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

The novel features of the disclosure are set forth here. A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION OF THE INVENTION

Figure 1:
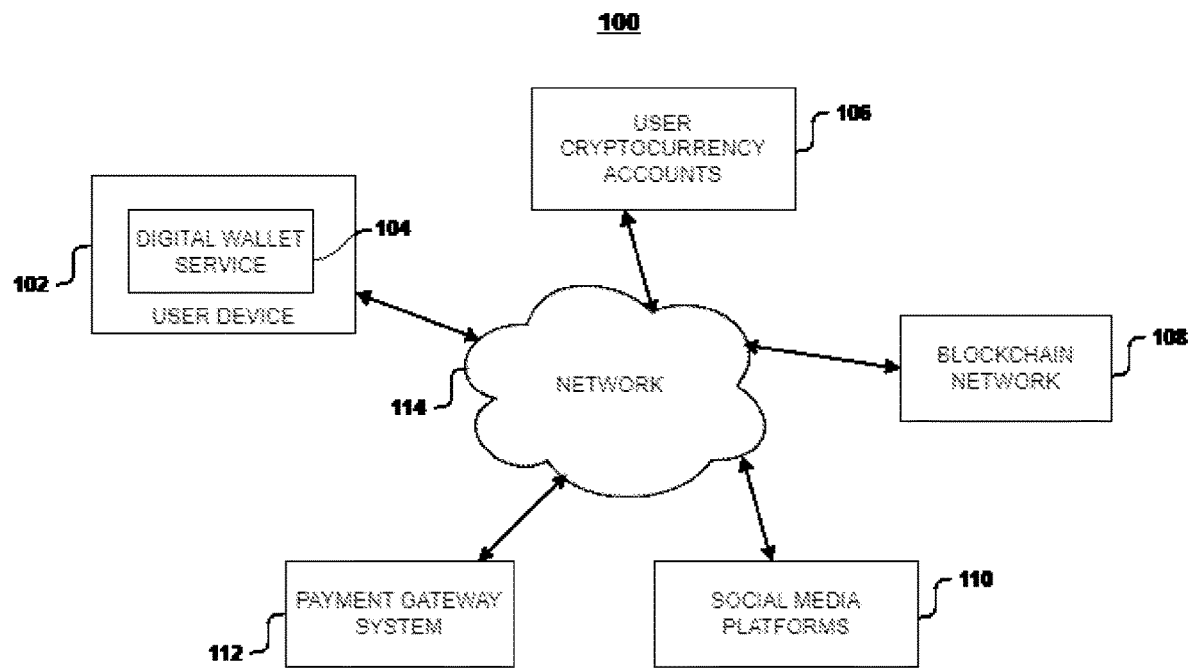
FIG. 1 is a block diagram of a user digital assets management system configured with functionality of securely managing digital assets of a user while maintaining privacy in an illustrative embodiment.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

In The foregoing and other aspects of the present disclosure are described in further detail in the sections that follow. It should be noted that the term "blockchain" is often used interchangeably with the term "distributed ledger"; Accordingly, the term "distributed ledger" as used herein should be broadly interpreted as including both blockchains and other types of distributed ledgers that do not employ this particular data structure/format.

The term "cryptocurrency" may mean a digital currency in which encryption techniques are used to regulate the generation of units of currency and verify the transfer of funds. Many cryptocurrencies include the use of a blockchain to provide security and prevent fraud as double spending. Some embodiments of the present disclosure may be used in alternate cryptocurrency mechanisms other than a blockchain. The system, method, and computer program products described herein may be applied to both centralized and decentralized cryptocurrency networks and databases.

In one embodiment, a platform for processing transactions wherein, digital agreements or smart contracts are executed between the user and the platform executed digitally and they exist across a distributed, decentralized blockchain network. Using smart contracts, the platform allows user or consumer devices interact with the platform without asking for identification, certificates or authentication.

In an embodiment, the user digital assets management system utilizes advanced cryptographic protocols and algorithms to ensure secure and efficient blockchain transactions across multiple blockchain networks. These protocols may include but not limited to Elliptic Curve Digital Signature Algorithm (ECDSA), Secure Hash Algorithm (SHA-256), and other widely accepted cryptographic standards.

In another embodiment, the user digital assets management system includes a payment gateway system that enables users to conduct transactions in fiat currency or cryptocurrencies, making it easy to exchange digital assets for traditional currencies or other cryptocurrencies.

In another embodiment, the user digital assets management system allows users convert their data across various social media platforms into JSON format and manage the data through a digital wallet service. This system provides the user complete control on their digital assets.

In another embodiment, the user digital assets management system provides various file storage solutions like but not limited to local browser storage, phone storage, or decentralized cloud storage and also, provides compatibility with various wallet solutions. The file storage solutions ensures that only the user has the decryption key for the file stored to ensure privacy and ownership of user data.

FIG. 1 shows a user digital assets management system 100 in an illustrative embodiment. The user digital assets management system comprises a user device 102 with a digital wallet service 104 linked to the user device 102, user cryptocurrency accounts 106, blockchain network 108, social media platforms 110 and payment gateway system 112 all of which are coupled to a network 114.

The user device 102 comprises a laptop, tablet or desktop personal computer, a mobile telephone, or another type of computer or processing device associated with a user within the system 100. Although only a single user device 102 is shown in the figure, the system 100 is assumed to include multiple such devices each associated with a different user. The digital wallet service 104 is set to run on to the user device 102.

In another embodiment, the user device of the consumer or user is assigned with a seemingly random but unique address in order to have a consistent address for routing, transacting or collecting data.

The cryptocurrency accounts 106 of the user are provided by one or more cryptocurrency vendors (not shown). The cryptocurrency accounts 106 are used by the user for performing transactions including buying or selling of cryptocurrencies and other digital assets.

The blockchain network 108, is used for maintain records of the user digital assets and processing them as per the requirements of the user.

The social media platforms 110 are the platforms where user data is linked and the digital wallet service 104 access one or more social media accounts linked to the social media platforms by obtaining user credentials from the user.

The payment gateway system 112 in the present embodiment is assumed to be associated with a financial institution such as a bank or other issuer of credit cards, debit cards or other types of payment cards or more generally payment mechanisms. Examples of payment mechanisms other than payment cards that can be utilized in illustrative embodiments include checks or other similar financial instruments. More particularly, in the case of a check or other similar financial instrument, an image of the check or financial instrument could be used in combination with evidence of user identity. Illustrative embodiments of secure cryptocurrency purchase functionality disclosed herein are generally utilizable with any form of financial instrument for which there is a need to verify the identity of the user.

The network 114, of the present embodiment can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

Figure 2:
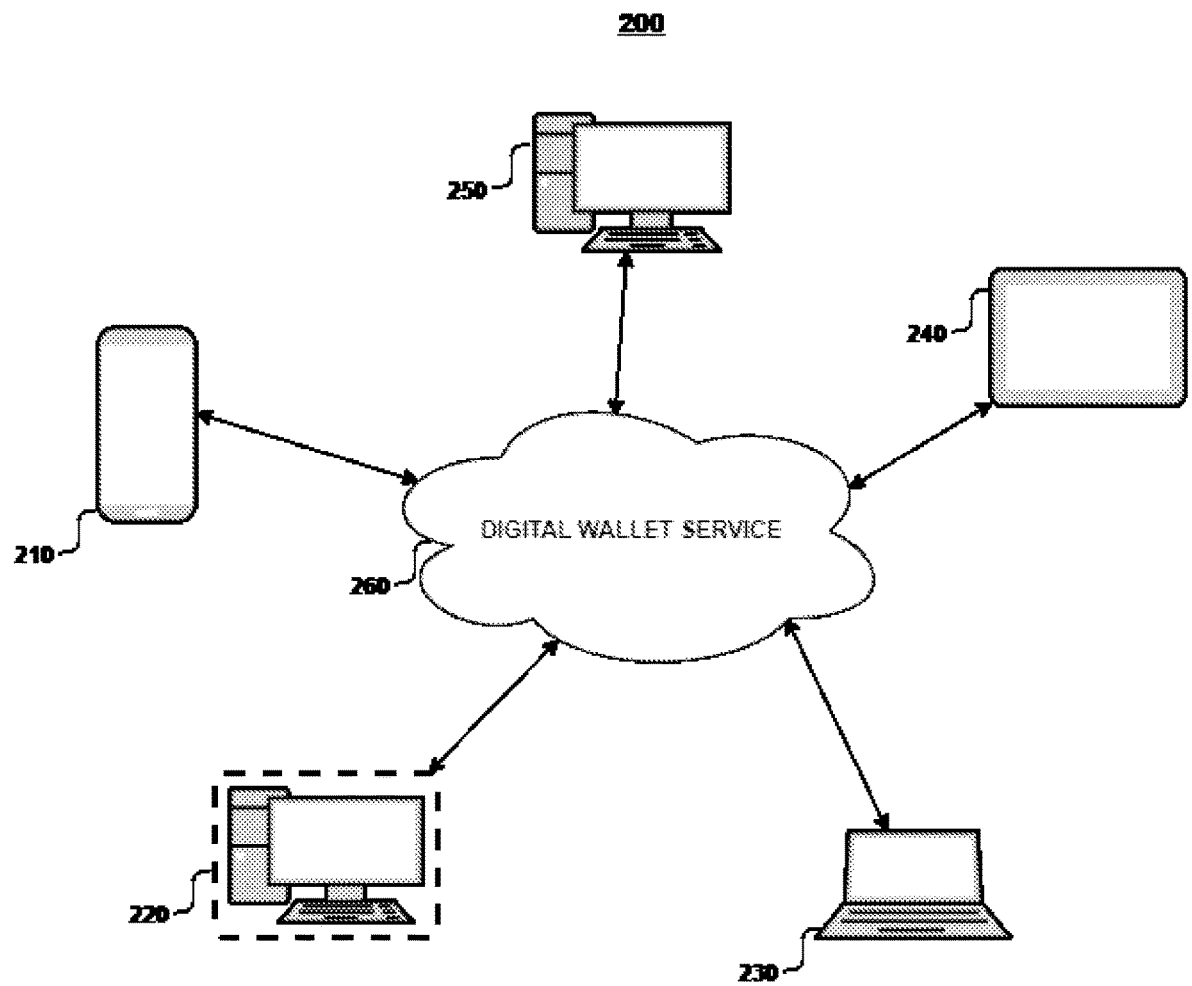
FIG. 2 illustrates an environment in which various user devices connecting to a digital wallet service in graphical representation.

FIG. 2, illustrates an environment 200 in which various user devices connecting to the digital wallet service 260 to run on them.

In some embodiments, the user devices can include but not limited to a mobile phone 210, a virtual computer 220, a laptop 230, a tablet 240, a computer 250.

Figure 3:
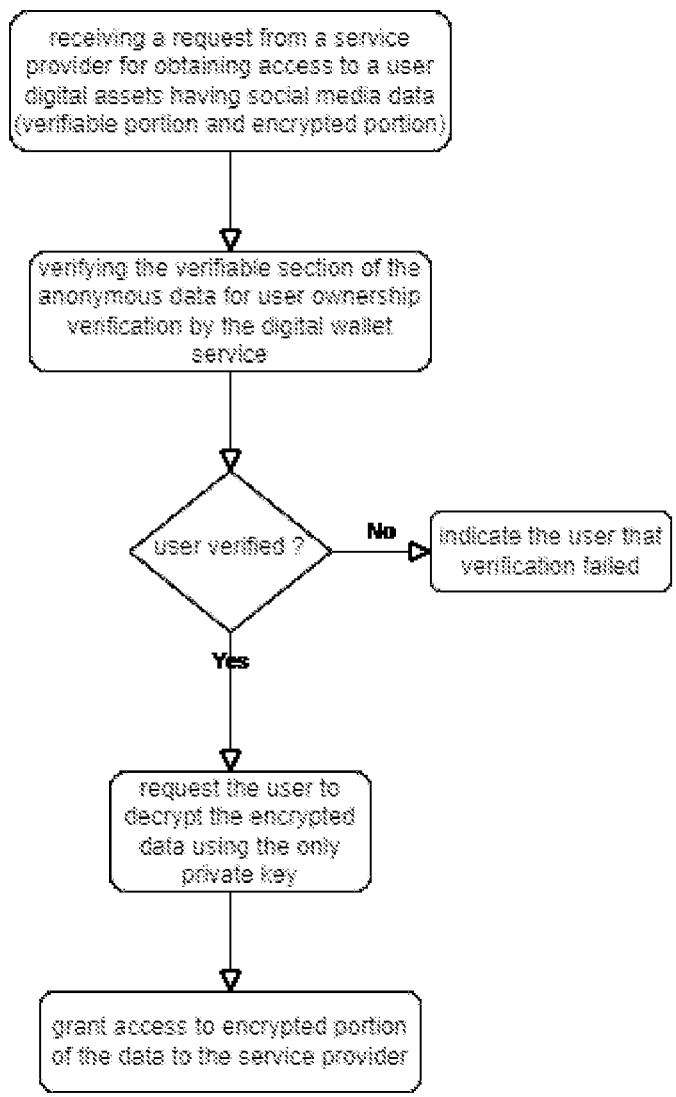
FIG. 3 illustrates a flow chart for performing a user verification, in accordance with an embodiment of the present invention.

FIG. 3, illustrates a user verification flowchart 300 depicting various steps involved in verifying the user by the digital wallet service before providing a service by a service provider.

Figure 4:
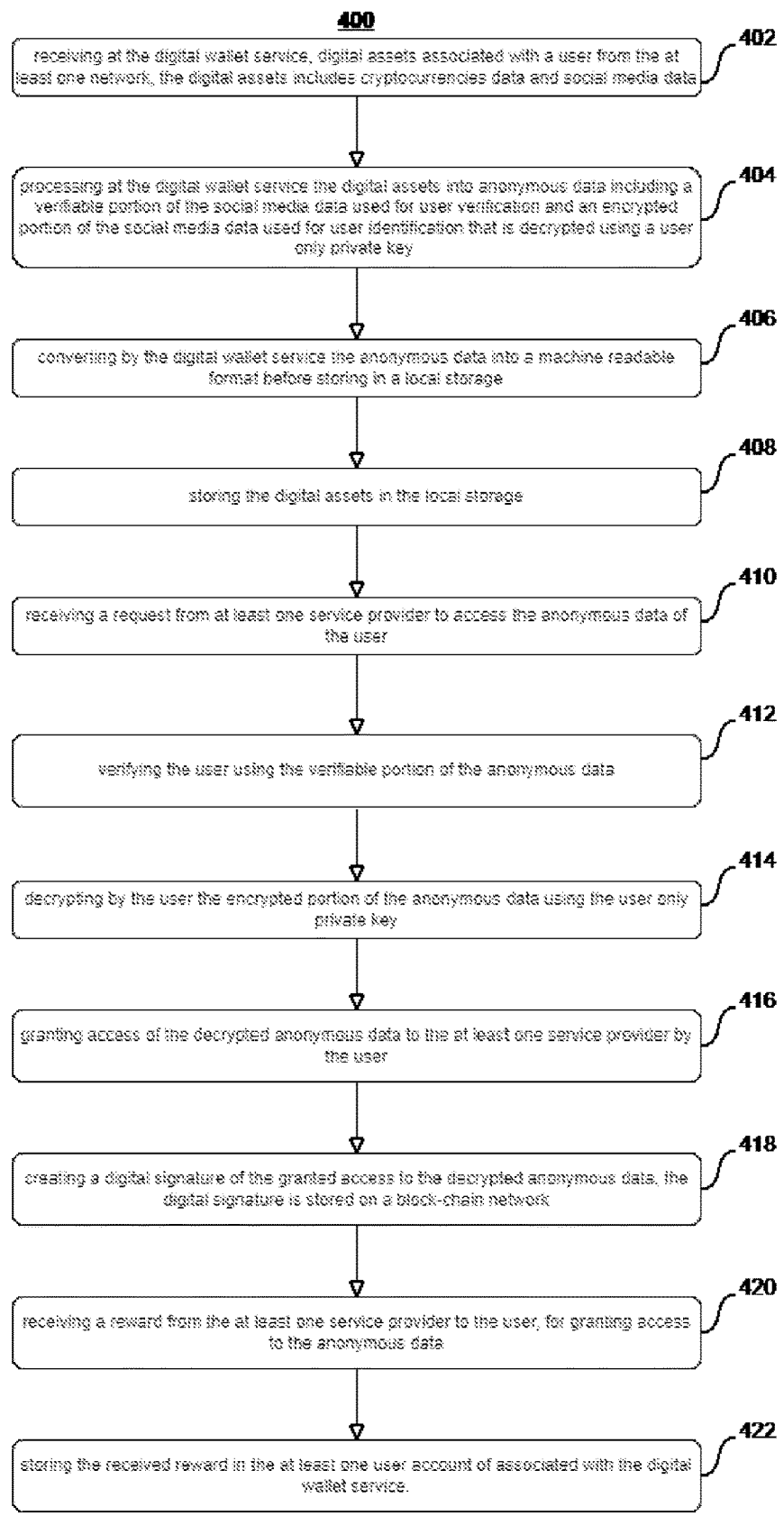
FIG. 4 illustrates a flow chart that includes various steps involved in user digital assets management, in accordance with an embodiment of the present invention.

FIG. 4. Illustrates various steps performed within the user digital assets management system 400 according to an embodiment of the present invention. The steps includes:

Step 402: receiving at the digital wallet service, digital assets associated with a user from the at least one network, wherein the digital assets includes cryptocurrencies data and social media data, the cryptocurrencies data is received from at least one user cryptocurrency account and the social media data is received from at least one user social media account;

Step 404: processing at the digital wallet service the received social media data into anonymous data, the anonymous data including a verifiable portion of the social media data used for user verification and an encrypted portion of the social media data used for user identification, wherein the encrypted portion is decrypted using a user only private key and the verifiable portion includes ownership data associated with the user only private key;

Step 406: converting by the digital wallet service the anonymous data into a machine readable format before storing in a local storage;

Step 408: storing the digital assets in the local storage;

Step 410: receiving a request from at least one service provider to access the anonymous data of the user;

Step 412: verifying the user using the verifiable portion of the anonymous data;

Step 414: decrypting by the user the encrypted portion of the anonymous data using the user only private key;

Step 416: granting access of the decrypted anonymous data to the at least one service provider by the user;

Step 418: creating a digital signature of the granted access to the decrypted anonymous data, wherein the digital signature is stored on a block-chain network;

Step 420: receiving a reward from the at least one service provider to the user, for granting access to the anonymous data; and Step 422: storing the received reward in the at least one user account of associated with the digital wallet service.

In some embodiments, the user can connect user email accounts like but not limited to Gmail connect and using email services or email address to pull the related information from social media or their related social identity.

In some embodiments, the digital assets are locally stored and in the machine readable formats like but not limited to JSON, CSV, XLS etc.

In some embodiments, the digital signatures or zero knowledge proofs can be stored on any networks or chains like but not limited to blockchain.

In one embodiment, the reward includes but not limited to cryptocurrency, fiat currency, cryptocurrency, coupons, gift cards or tokens.

In some embodiments, the digital wallet service can be but not limited to a mobile extension, mobile application, desktop application, software, plugin or physical device (e.g. card).

In some embodiments, the digital wallet service has an SDK so other developers, applications and platforms can integrate and tweak the application to their fitting (plug and play).

In some embodiments, the digital assets can include but not limited to financial data (e.g. cryptocurrency, bank, credit cards, debit cards), healthcare data, biometric data, purchasing data, locational data, browsing data.

In some embodiments, the digital wallet service can display user credentials and user profiles as "cards" within the digital wallet service.

In some embodiments, the digital wallet service is able to use it's own file storage platform to store locally stored files, or partner with third party providers to offer additional storage past the wallet limit.

In one embodiment, smart contracts for e.g. digital agreements are created between the digital wallet service and the user which helps the user in accessing the application without any need for identification, verification or authentication.

In some embodiments, the system can utilize Artificial Intelligence (AI) to verify user credentials, data, and proofs, detect user and data anomalies, automate transaction processing and AI algorithms for encryption.

In some embodiments, the digital wallet service provides chat tool or use third party service providers using APIs to allow wallet to wallet communications and user communication.

In some embodiments, the system also provides social recovery, biometric recovery, and document uploads or user identification in order to recover user account.

In some embodiments, the system provides privacy and security like but not limited to advanced encryption standards, secure multi-party computation, differential privacy, or homomorphic encryption.

In some embodiments, the received reward in a user cryptocurrency account of the user if the reward is cryptocurrency or converting the reward to cryptocurrency if it is other than cryptocurrency before storing the received reward in the user cryptocurrency account.

In some embodiments, the cryptocurrency includes but not limited to digital tokens, cryptocurrency, virtual tokens, physical currency in digital form or Non-Fungible Tokens and can also be swapped for any type of currency or token.

In other embodiment, the wallet address associated with the user is randomly generated by the service provider for routing, transacting or collecting the data associated with the user and the tokens.

In another embodiment, the digital assets includes but not limited to user data, cryptocurrency, virtual currency, digital currency, Non-Fungible Tokens etc. and can also be swapped for any type of currency or any tokenized assets.

In one embodiment, the service provider can request for personal or specific information from the user and upon acceptance for exchanging of the user data tokens are generated. The users may be rewarded for additional data but not limited to uploads, updates, additions, amendments, surveys/questionnaire etc. The tokens may be utilized to but not limited to pay a vendor or third party for a product or a service.

In another embodiment, one or more transactions between the user and the digital wallet service are logged at the blockchain network for e.g. transaction audit logs and other traceability features of blockchain based communications disclosed herein provide support for preservation of data input and transparency of transactions (e.g. token mint, issuance). As an example, if a party wants to determine when, if or how a token was issued for their input, the prior data of the blockchain is readily available and traceable to do so.

In some embodiments, The user digital assets management system includes a flexible and decentralized file hosting system that allows users to store and access files from a variety of sources, including local phone storage, web browsers, and cloud storage platforms, without compromising privacy or security.

In an embodiment, the user digital assets management system includes an integrated NFT system that enables users to receive, store, and transfer unique digital assets with ease and transparency, using cutting-edge blockchain technology.

In another embodiment, the user digital assets management system includes a social media API sharing system that enables users to share their social media APIs with others, promoting greater collaboration and data sharing within the social media ecosystem.

In some embodiments, a user can integrate their hardware wallet with the digital asset management system, enabling them to manage and transact their digital assets across multiple chains in a secure and efficient way.

In some embodiments, through the digital wallet service a user can connect their respective social media accounts and containerize the information in the wallet. They can authorize transfers and sales of their personal information and be compensated in cash or cryptocurrencies (including NFTs).

In some embodiments, the digital wallet service acts as a data infrastructure layer that provides a secure and reliable way to store and access information. It acts as a communication layer between file storage system and user data, making it easy to store and manage files in a secure way.

In an embodiment, users can encrypt their data before sharing it with a service provider or a server or the digital wallet service, and they are the only ones with the key to access their data. The key is not loaded on the remote server, which means that even if the stored file is accessed by any entity including but not limited to a service provider or a server or the digital wallet service, it cannot be decrypted.

In another embodiment, The digital wallet service can be a browser extension acts as an essential tool for managing data securely. The extension uses a database inside the browser, making it a data wallet that saves information in the browser's local storage. When the user goes online, their information is automatically synchronized. The extension runs in the background, allowing users to easily store and manage JSON files inside the XDB. Additionally, the browser extension is also available as a mobile application, providing users with easy access to their data on the go.

In another embodiment, the user data includes but not limited to data associated to user's social network profile, customized profile, or personal information etc.

In one embodiment, the application may enable the user to track utilization and monetization process of their data more transparently. The user may be able to access and track revenue outcome, price appreciation, or other forms of asset monetization. For example, a value-based reward system tracked utilizing blockchain may be implemented. Smart contracts are utilized with blockchain to ensure proper utilization and monetization of the data for verification purposes. The reward generation process in exchange of the user data/profile provides proof of ownership to the user and ensures contract conditions are written into the smart contract code within the blockchain structure. The blockchain network records maintain and track the creation, issuance, management, and monetization of each reward throughout the lifetime of the user's involvement and ownership of their data.

In one embodiment, the user may be prompted, incentivized and rewarded by the service provider with additional rewards for sharing their data/profile as well as for additional participation in surveys, watch a video, verify, a purchase, add studies, product marketing, expanded data provisioning, and questionnaires.

In other embodiment, the user may be incentivized to provide additional data, but not limited to pictures, audio content, videos, sharing access to third-party applications, search data, views, likes, shares, comments etc. The user data that is recorded and stored may reside permanently on the blockchain network. Thus, the user is incentivized to maintain, share, and update their data.

In another embodiment, the users are rewarded for sharing specific data required by the service provider or advertisers or third parties. The data stored on the blockchain network can be purchased by advertisers who provide incentives, rewards, or donations in exchange for access to the users data and can be used for analytics, marketing, and advertisement targeting.

In another embodiment, using the digital wallet service, users can store and manage various digital file formats including audio, text, video, gif, PDF, and any other type of digital file.

In another embodiment, the locally stored files on the digital wallet service are retrievable anywhere, making it possible for users to access their files anytime, anywhere.

In another embodiment, the user digital assets management system is a smart contract-based system that stores information in web3, with actions executed in web2.

In some embodiments, the specialized data can be anonymous data or non-anonymous data.

In another embodiment, the user's digital signature could be stored on but not limited to a blockchain network, in the cloud, in the digital wallet service or the user device.

In another embodiment, the user can assign each of the digital assets with a unique user only key and the user can also authorize other users or entities to generate duplicate keys to access the encrypted portion of the digital assets.

In another embodiment, the digital wallet service has the ability to tokenize the digital assets and convert them into non-fungible tokens (NFT).

In some embodiments, the NFT's can be traded online, allowing the user to approve or deny access using smart contracts and using the blockchain as a ledger to track transactions.

In another embodiment, the digital assets can be but not limited to data related to IP rights, insurance policies, music and media rights.

In some embodiments, The data could come from Internet of Things (IOT) devices and the digital wallet service could connect to IOT devices for information and data from user devices.

In another embodiment, The digital wallet service could have MFA in order to better protect security.

In some embodiments, the system can also includes QR codes as a touchpoint to connect to other applications and share user digital identity or address.

In another embodiment, the user device can include a camera and the digital wallet service can request the user for access to the camera to scan QR codes.

In another embodiment, the user digital assets management system allows users to switch phones and keep their information in between swaps or even lose their phones and still retain their information on the platform.

In some embodiments, the users can sign in to the digital wallet service using a user mail account, which serves as their web2 digital identity connector. This integration allows the digital wallet service to collect and aggregate users' personal information, which is then converted into JSON format and stored locally on their devices using the user interface. By utilizing the user mail account as a central hub, the digital wallet service can securely collect and aggregate users' personal information from various connected social media platforms. This aggregated data is then transformed into JSON format and securely stored locally on the user's device using the user interface.

In another embodiment, the digital wallet service enables users to authorize the sale and transfer of their data from their wallet to third parties. The users can monetize their data while maintaining control over its usage and ensuring secure transactions. In addition to data authorization and transfer, the user digital assets management in association with the digital wallet service enables users to create digital signatures as proof of their data contributions or actions. These digital signatures serve as immutable records on one or various blockchains, providing a timestamp and validating the authenticity and integrity of the data. The digital signature feature adds an extra layer of trust and security to the data management process. Users can demonstrate the credibility and legitimacy of their data contributions or actions, providing a reliable and auditable trail.

In another embodiment, the user digital assets management system provides Zero-Knowledge Proofs, to protect user privacy while verifying their participation in market research or other activities, the system utilizes zero-knowledge proofs (zkp) to verify the user's identity and ownership of the decryption key without revealing any personally identifiable information, ensuring anonymity and security.

In some embodiments, users can authorize the sale and transfer of their data securely within the system. The invention provides a mechanism for users to retain control over their digital assets while enabling authorized data transfers to third parties. Digital signatures are utilized as timestamp proofs of data contributions or actions, ensuring the authenticity and integrity of the data. This enables data traceability of the data access by the service providers or third parties.

In some embodiments, the system includes a user recovery system which provides option to recover user accounts when lost. ### To build zkp identity recovery using social network information:

We request the user's permission to access their social network information. This can include data such as social media profiles, friends list, connections, activity history, or any other relevant data that can help verify the user's identity.

We verify the authenticity of the social network information by validating the user's ownership of the social network accounts using social network APIs.

We generate backup credentials for the user during the initial account setup or registration process. These credentials should be securely stored and associated with the user's account.

We link the user's social network information with their identity profile in your system. This linking can be done by storing references to the user's social network accounts or by securely storing relevant social network data within the user's identity profile.

We define a process for identity recovery using social network information. This process should outline the steps a user needs to follow in case they need to recover their identity. It can involve providing specific social network information, verifying ownership of social network accounts, or following a series of authentication steps to regain access to the account.

Finally, we implement mechanisms to verify and validate the user's identity during the recovery process. This can include comparing the user's provided social network information with the stored information, confirming the authenticity of social network connections or activities, or utilizing additional authentication factors to strengthen the identity recovery process.

In some embodiments, the user social media data or any other data can be stored as JSON, CSV, Blob types into the user device.

In some embodiments, the user digital assets management system utilizes various protocols including but not limited to Iden3 protocol, PolygonID framework, Push protocol, Qr Codes, zkQuery language, Merkle Tree algorithm, BJJ algorithm, zkSNARK cryptography algorithms, DID (Decentralized Identifier) or VCs (Verifiable Credentials).

The architecture of the framework is composed of three modules: Identity Holder, Issuer, and Verifier. It is fully compliant with the W3C standards.

Identity Holder: An entity that holds claims in its Wallet A VC, as mentioned above, is issued by an Issuer to the Holder. The Identity Holder generates zero-knowledge proofs of the VCs issued and presents these proofs to the Verifier, which verifies that the proof is authentic and matches specific criteria.

Issuer: An entity (person, organization, or thing) that issues VCs to the Holders. VCs are cryptographically signed by the Issuer. Every VC comes from an Issuer.

Verifier: A Verifier verifies the proof presented by a Holder. It requests the Holder to send a proof based on the VCs they hold in their wallet. While verifying a proof, the Verifier performs a set of checks, for example that the VC was signed by the expected Issuer and that the VC matches the criteria requested by the Verifier. The simplest examples of a Verifier is a Bar that wants to verify if you are over 18. In the real world, the Identity Holder would need to provide an ID and show all their personal information. With it, they only need to pass a proof.

A core concept here is the_trust_that must exist between a Verifier and an Issuer: the fact that the information contained inside a VC is cryptographically verifiable doesn't guarantee its truth. The Issuer must be a trusted and reputable party so that Verifier can consume the VCs originated by that Issuer.

Every identity is identified by a unique identifier called DID (Decentralized Identifier). Every identity-based information is represented via Verifiable Credentials (VCs).

In the simplest terms, a VC represents any type of information related to an individual/enterprise/object.

The VC could be as simple as the age of the entity or the highest degree held by it. It could be a membership certificate issued by a DAO, for instance.

The owner of a credential can prove to another party that a credential is true, without revealing any information beyond the validity of the credential itself using zkSNARK cryptography.

The Verifier can request any proof of the information contained in the identity credential (using the zkQuery Request Language) and obtain guaranteed correctness without access to the private credential.

There are two ways those credentials can be issued: using _BJJ key Signature_or_Merkle Tree Proof_.

SIG Method: Issuance of Credentials with Baby JubJub (BJJ) Key Signatures

The credential is not added to the Issuer's Merkle tree, instead a baby jub jub (BJJ) signature is used which is then verified upon presentation. With this method, issuers can issue a large number of credentials without needing to spend any gas to issue the credentials.

MTP Method: Issuance of Credentials with Merkle Tree Proof

The validation of the proof is done against the state published on-chain. No personal information is stored on-chain. A key difference with this method is that the identity state has to be published on-chain (the hash of the merkle trees), since the Identity State Transition function has to be executed.

In some embodiments, the anonymous data is partially encrypted using a hashing algorithm or an encryption protocol.

In some embodiments, the user digital assets management system may include monitoring user activities. The system may passively monitor, without gaining access to private or protected personal information, activities stored in the user device. Such monitoring may include monitoring public social media, e.g., tracking a user's actions through public postings to Facebook, Twitter, Four Square, and the like. In some embodiments, the system may present services available to the user at a relevant time. That relevant time may be determined, in part, by monitoring user activities. The information from the system may also be retrieved or specifically transmitted to the system in a partially or fully anonymized format. In some embodiments, the system may request access to particular personal information in order to complete the service (e.g., requesting access to particular personal information stored in the user device.

The devices, systems, components and equipment of the system may include but not limited to, computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system may be utilized by any number of users, organizations, or providers to aggregate, manage, review, analyze, process, tokenize, distribute, advertise, market, display, and/or monetize the user data. For example, the user data may be utilized in marketing or advertisements for goods or services.

In one embodiment, the system may utilize any number of secure identifiers (e.g., passwords, pin numbers, certificates, etc.), secure channels, connections, or links, virtual private networks, biometrics, or so forth to upload, manage, and secure the data, generate tokens, and perform applicable transactions. As noted, the system may be a blockchain network system that utilizes a digital ledger to document and track transactions involving the data or utilization thereof.

In another embodiment, the device includes but not limited to, mobile, desktop, tablet, laptop or common devices that may be utilized to receive and manage data and perform transactions. Other examples of devices may include e-readers, cameras, video cameras, audio systems, gaming devices, vehicle systems, kiosks, point of sale systems, televisions, smart displays, monitors, entertainment devices, medical devices, virtual reality/augmented reality systems, or so forth. The devices may communicate wirelessly or through any number of fixed/hardwired connections, networks, signals, protocols, formats, or so forth.

In another embodiment, the user as explained in various embodiments can be an individual, a company or any interested entity.

In one embodiment, the inputting of the user data on to the device is done via an input device that can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information.

In one embodiment, the system includes servers and databases. The servers may include but not limited to a web server utilized to provide a website, mobile applications, and user interface for interfacing with numerous users. The user data received by the web server may be managed by the service providers managing the servers and associated databases. For example, the web server may communicate with the database to respond to read and write requests. The servers may include one or more servers dedicated to implementing and recording blockchain transactions and communications involving the user data. The databases may store a digital ledger for updating information relating to the user's data as well as utilization of that data. The databases may utilize any number of database architectures and database management systems (DBMS) as are known in the art. The databases may store the content associated with each user/consumer/purchaser which may specify an address, name, age, demographics, interests, family/friend information, biometric identifiers, payment information, permissions, settings, location, cause preferences, cause restrictions, and so forth. Any number of secure identifiers, such as tones, QR codes, serial numbers, or so forth may be utilized to ensure that content, personal, or transaction information is not improperly shared or accessed.

In one embodiment, the user interface may be made available through the various devices of the system. The user interface represents a graphical user interface, audio interface, or other interface that may be utilized to manage user data and information. For example, the user may enter or update associated data utilizing the user interface (e.g., browser or application on a mobile device).

In another embodiment, the platform may utilize artificial intelligence. The artificial intelligence may be utilized to enhance data and increase its value. For example, artificial intelligence may be utilized to review, authenticate, and validate data that is received by the platform. The artificial intelligence of the platform may be utilized to ensure that the user data is improved, accurately analyzed, and value increased.

In one embodiment, the platform may extract the user data from third-party platforms by opting in and providing user credentials to various applications (e.g., Facebook, Twitter, Reddit, News Sites, Amazon, Google, etc.) the platform may extract data from different sources.

In another embodiment, the digital wallet service or application running on the platform may request user for additional user data such as but not limited to behavioral information, psychological, mood data, and other intangible data. The user data may be validated through artificial intelligence, machine learning, human analysts/consultants, or other automated or manual processes.

The users may be incentivized or prompted to upload data to the application. The application may also receive amended, updated, or additional data from the users at any time as described herein. The users may have a digital agreement for the distribution of the user data to the third-party sellers or other interest parties. The digital agreement or smart contract may specify how, when, and what portions of the user data may be used as well as the associated compensation terms. The digital agreement may specify that the user data may be purchased, licensed, rented, leased, or otherwise managed by the system.

In one embodiment, the tokens generated for the users in exchange for the user data may vary based on the volume, quantity, verification, and types of information included in the user data. Blockchain-based currencies may be utilized to compensate the users. Full tokens or partial tokens may be utilized to most accurately represent the values being exchanged. The user may be compensated with rewards or tokens (e.g., Bitcoin, Ethereum, LTC, Doge or other proprietary tokens, etc.)

In one embodiment, cryptographic hash addresses are used as a unique address for the user device, this allows the users to input their information and hide identity as well as connection to the information. The users can anonymously store their information and verify whether they want to store data in exchange for cryptocurrency.

In another embodiment, user only private keys are generated by the application for the stored data through cryptography. The user is provided with the private key and can verify the user data with the private key. The system can verify user signature for that particular user data without any key.

In other embodiment, if the user verifies or confirms to store the user data into a database or storage, the application scans and confirms the data stored in the database or the storage and generates digital assets.

In another embodiment, the user can control the access to the user data and can assign permissions to the service providers or any entities to utilize the user data in exchange of any monetary benefit. The monetary benefit includes tokens, NFT's or any crypto currency but can also include physical currency or any vouchers.

In other embodiment, upon verification using the private key, user will have their information stored and have a record of this transaction on the blockchain network. The user can check who and where the user data is being used.

In another embodiment, the tokenization process happens on the blockchain network and is executed by smart contracts, these events are transacted on the blockchain network, giving us a public record as well as a digital map where the tokens can be stored and maintained.

In one embodiment, the system for managing user digital assets may also include one or more devices utilized to enable, initiate, generate, aggregate, analyze, process, and manage data, transactions, and so forth with one or more communications or computing devices. The one or more devices networked to manage the cloud network and the system. The system may include any number of servers, routers, switches, or advanced intelligent network devices.

In other embodiment, user identity is verified using a third party KYC or verification tool from which they can begin to act anonymously once they have verified their identity or single presence In another embodiment, a double username function is created by the application or platform, which allows user to sign in as one name, and then operate as another with or without kyc.

In one embodiment, the system can be configured in a way where the user inputs personal information into a "digital plug-in" or "browser attachment" which also tracks certain digital or personal information and reports or confirms the certain digital or personal information to the application or platform or software which issues tokens and perform various transactions.

In another embodiment, the system is configured where, the user inputs data or information and tokens are generated as a reward in the form of an NFT which stores information and user earns a specific dividend (tokens) upon confirmation of information on blockchain network. The user can also receive NFT as a token associated with the user information, which can be resold within the platform i.e. a marketplace.

In one embodiment, the user stores information in a central or decentralized file storage solution, and all aspects can be interchangeably hosted on a combination or sole storage solution (e.g. data hosted decentrally, tokens issued centrally, NFT hosted centrally)

In another embodiment, The system can be a cloud system or cloud network that represents a cloud computing environment utilized to aggregate, process, manage, sell, monetize, and distribute data and support the associated transactions and utilization. The cloud system may implement a blockchain system for managing the data. The cloud system allows goods and services from multiple businesses, users, managers, or service providers to be centralized.

In one embodiment, for the block chain and smart contracts, the user data or information can be decentralized and distributed across multiple devices in a peer to peer network. The system, method, and computer program products described herein may be applied to both centralized and decentralized cryptocurrency networks and databases.

In one embodiment, the users can earn a token for the data or information input and the tokens can be credits that are generated using a digital credit system associated to the user and the platform or application or software. The credits are generated when appropriate or based on a specific calendar or schedule (e.g. quarterly or weekly or yearly)

In another embodiment, credits generated by the existing digital credit system for e.g. credit card or debit card or voucher etc. can be converted to digital tokens and can also be exchanged for any type of tokens.

In one embodiment, the system could operate as a Decentralized Autonomous Organizations (DAO) with smart contracts automatically handling all the interactions, processing, mining and token issuance with users using the tokens or credits as a voting system or governance system.

The system explained herein can be a computer system and the computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, system memory, and bus that couples various system components including system memory to processor. Processor may include software module that performs the methods described herein. The module may be programmed into the integrated circuits of processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus. Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable volatile/non-volatile computer system storage media. By way of example only, storage device can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces.

Computer system may also communicate with one or more external devices such as a keyboard, a pointing device, a display, etc; one or more devices that enable a user to interact with computer system; and/or any devices (e.g., network card, modem, etc.) that enable computer system to communicate with one or more other computing devices. Such communication can occur via Input/Output (I/O) interfaces.

Computer system can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Aspects of the present disclosure are described with reference to flowchart illustrations and/or block diagrams of methods, apparatus (systems) and computer program products according to some embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

The present invention may be embodied in other specific forms without departing from its spirit or essential characteristics. The described embodiments are to be considered in all respects only as illustrative and not restrictive. The scope of the invention is, therefore, indicated by appended claims rather than by the foregoing description. All changes which come within the meaning and range of equivalency of the claims are to be embraced within their scope.

I claim:

1. A computer implemented user digital assets management method configured to be implemented using a digital wallet service that operatively communicates with at least one service provider and at least one user device via at least one network, the method comprising:
 a. receiving at the digital wallet service, digital assets associated with a user from the at least one network, wherein the digital assets includes cryptocurrencies data and social media data, the cryptocurrencies data is received from at least one user cryptocurrency account and the social media data is received from at least one user social media account;
 b. processing electronically by the digital wallet service over a server the received social media data into specialized data, wherein the specialized data includes a verifiable portion of the social media data used for user verification and an encrypted portion of the social media data used for user identification, that is decrypted using a user only private key and the verifiable portion includes ownership data associated with the user only private key;
 c. converting by the digital wallet service the specialized data into a machine readable format before storing in a local storage;
 d. storing the digital assets in the local storage;
 e. receiving a request from at least one service provider to access the specialized data of the user;
 f. verifying the user using the verifiable portion of the specialized data;
 g. decrypting by the user the encrypted portion of the specialized data using the user only private key;
 h. granting access of the decrypted specialized data to the at least one service provider by the user;
 i. creating a digital signature of the granted access to the decrypted specialized data;
 j. storing the digital signature on a block-chain network;
 k. receiving a reward from the at least one service provider to the user, for granting access to the specialized data; and
 l. storing the received reward in the at least one user account associated with the digital wallet service.

2. The method of claim 1, further comprising:
   initiating a transaction using a payment service provider, wherein the transaction includes selling or buying of the digital assets by the user.

3. The method of claim 1, wherein the digital signature is added with timestamp or data authenticity information and is stored in the local storage, the user device, the digital wallet service, or a cloud network.

4. The method of claim 1, wherein the user can be a company, an entity or an individual.

5. The method of claim 1, wherein the specialized data can be anonymous or non-anonymous and the encrypted portion of the specialized data is encrypted using a hash algorithm or a cryptographic method by the digital wallet service.

6. The method of claim 1, further comprising:
   a. determining by the digital wallet service the type of the received reward; and
   b. storing the received reward in a user cryptocurrency account of the user if the reward is a cryptocurrency asset or converting the reward into the cryptocurrency asset if it is other than the cryptocurrency asset before storing the received reward in the user cryptocurrency account, wherein the cryptocurrency asset can be but not limited to digital token, cryptocurrency, virtual token, physical currency in digital form or Non-Fungible Token and the cryptocurrency asset can exchanged for any type of currency or token, wherein the reward can be but not limited to fiat currency, cryptocurrency, coupons or gift cards.

7. The method of claim 1, further comprising: obtaining by the digital wallet service from the user one or more user credentials for accessing the at least one user social media account to receive the social media data, wherein the digital wallet service over the server performs tokenization of the digital assets of the user and convert the tokenized digital assets into non-fungible tokens.

8. The method of claim 1, wherein, each of the digital assets have a unique user only key, wherein the user can provide permission to a third party to generate the unique user only key for each of the digital assets through the digital wallet service.

9. The method or claim 1, the user device further comprises:
   a. a display, wherein the display displays a user interface of the digital wallet service;
   b. a touch screen attached to the display for accepting inputs from the user through a user interface; and
   c. one or more electronic components for processing one or more transactions of the digital wallet service including data storage and other processes.

10. The method of claim 1, wherein the digital wallet service can generate backup credentials for the user before accessing the at least one user social media account for social media data of the user.

11. A user digital assets management system, comprising:
   a. circuitry for receiving digital assets associated with a user from one or more networks, wherein the digital assets includes cryptocurrencies data and social media data, the cryptocurrencies data is received from at least one user cryptocurrency account and the social media data is received from at least one user social media account;
   b. circuitry for processing the received social media data into specialized data, the specialized data including a verifiable portion of the social media data used for user verification and an encrypted portion of the social media data used for user identification, wherein the encrypted portion is decrypted using a user only private key and the verifiable portion includes ownership data associated with the user only private key;
   c. circuitry for converting the specialized data into specialized data using a machine readable format;
   d. circuitry for storing the digital assets in a local storage;
   e. circuitry for receiving a request from at least one service provider to access the specialized data of the user;
   f. circuitry for verifying the user using the verifiable portion of the specialized data;
   g. circuitry for decrypting the encrypted portion of the specialized data using the user only private key by the user;
   h. circuitry for granting access of the decrypted specialized data to the at least one service provider by the user;
   i. circuitry for creating a digital signature of the granted access to the decrypted specialized data, wherein the digital signature is stored on a block-chain network;
   j. circuitry for receiving a reward from the at least one service provider to the user, for granting access to the specialized data, wherein the reward includes fiat currency or cryptocurrency; and
   k. circuitry for storing the received reward in the at least one user cryptocurrency account of the user if the reward is cryptocurrency or converting the reward to cryptocurrency if it is fiat currency before storing the received reward in the at least one user cryptocurrency account.

12. The system of claim 11, wherein the user only private key can be but not limited to a hardware token key or a software token key and is in control of the user specifically linked by the digital wallet service.

13. The system of claim 11, wherein the cryptocurrency data of the digital assets includes data related to but not limited to digital tokens, cryptocurrency, virtual tokens, physical currency in digital form or Non-Fungible Tokens of the user.

14. The system of claim 11, wherein the user includes but not limited to individuals, organizations or automated agents/applications.

15. The system of claim 11, wherein the specialized data can be anonymous or non-anonymous, wherein the encrypted portion of the specialized data is accessed by the at least one service provider to provide one or more services to the user.

16. The system of claim 11, wherein the cryptocurrencies of the user are obtained from one or more cryptocurrency vendors.

17. The system of claim 11, wherein the reward provided by the at least one service provider to the user is for performing one or more activities that includes but not limited to uploads, updates, additions, amendments or surveys/questionnaire and the digital tokens may be utilized to but not limited to pay a vendor or third party for a product or a service.

18. The system of claim 11, wherein the circuity can be a user device having one or more applications accessible to the user, wherein the inputting of instructions by the user on to the user device is done via an input device that includes but not limited to a keyboard, pointing devices such as mouse, trackball, touchpad, a touch-screen incorporated into a display, audio input devices like voice recognition systems, microphones, motion-based controllers, or any other types of input devices.

19. The system of claim 11, wherein the social media data can be the data associated to but not limited to user's social network profile, customized profile, or personal information.

20. The system of claim 11, wherein the system generates zero knowledge proofs which are used to verify the ownership of the user using the verifiable portion of the anonymous data without accessing the encrypted portion.

* * * * *